(12) United States Patent
Makino et al.

(10) Patent No.: US 8,782,620 B2
(45) Date of Patent: Jul. 15, 2014

(54) PROCESSING REIFIED GENERICS IN OBJECT-BASED PROGRAMMING ENVIRONMENTS

(75) Inventors: Yuki Makino, Tokyo (JP); Mikio Takeuchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 13/494,698

(22) Filed: Jun. 12, 2012

(65) Prior Publication Data
US 2013/0332911 A1    Dec. 12, 2013

(51) Int. Cl.
*G06F 9/45*    (2006.01)

(52) U.S. Cl.
USPC .......................... 717/137; 717/136; 717/140

(58) Field of Classification Search
USPC .......................... 717/136–141, 148
IPC .......... G06F 8/31,8/37, 8/40, 8/41, 8/51, 8/315, G06F 9/4428
See application file for complete search history.

(56) References Cited

U.S. PATENT DOCUMENTS

| | | | |
|---|---|---|---|
| 5,390,314 A * | 2/1995 | Swanson ........................ | 717/138 |
| 5,751,982 A * | 5/1998 | Morley ........................... | 712/209 |
| 6,091,897 A * | 7/2000 | Yates et al. .................... | 717/138 |
| 6,282,702 B1 * | 8/2001 | Ungar ............................ | 717/148 |
| 6,772,413 B2 * | 8/2004 | Kuznetsov .................... | 717/136 |
| 7,039,904 B2 * | 5/2006 | Sokolov ........................ | 717/147 |
| 7,100,150 B2 | 8/2006 | Polk | |
| 7,275,079 B2 | 9/2007 | Brodsky et al. | |
| 7,734,895 B1 * | 6/2010 | Agarwal et al. ................. | 712/13 |
| 7,774,746 B2 * | 8/2010 | Mansfield et al. ............ | 717/106 |
| 7,774,751 B2 * | 8/2010 | Zhuk ............................. | 717/120 |
| 7,934,203 B2 * | 4/2011 | Lovett et al. .................. | 717/136 |
| 7,962,888 B2 | 6/2011 | Rojer | |
| 8,127,280 B2 * | 2/2012 | Thomas et al. ............... | 717/136 |
| 8,136,102 B2 * | 3/2012 | Papakipos et al. ............ | 717/140 |
| 8,166,468 B2 * | 4/2012 | Foley et al. ................... | 717/159 |
| 8,392,897 B2 * | 3/2013 | Franz et al. ................... | 717/146 |
| 8,522,223 B2 * | 8/2013 | Wang et al. ................... | 717/149 |
| 8,584,106 B2 * | 11/2013 | Papakipos et al. ............ | 717/140 |

FOREIGN PATENT DOCUMENTS

| | | |
|---|---|---|
| JP | 2005284729 | 10/2005 |
| JP | 2010123060 | 6/2010 |

OTHER PUBLICATIONS

Takeuchi et al, "Compiling X10 to Java", ACM, pp. 1-10, 2011.*
Takeuchi et al, "Java Interoperability in Managed X10", ACM, pp. 39-46, 2013.*
Takeuchi et al, "Fast Method Dispatch and Effective Use of Primitives for Reified Generics in Managed X10", ACM, pp. 1-7, 2012.*
Preußer et al, "Enabling Constant-Time Interface Method Dispatch in Embedded Java Processors", ACM, pp. 196-205, 2007.*

* cited by examiner

*Primary Examiner* — Anil Khatri
(74) *Attorney, Agent, or Firm* — Cantor Colburn LLP; Vazken Alexanian

(57) ABSTRACT

A system processes a reified generic. The system includes a memory device to store programming code in a first language, the programming code including a definition and an invocation of an interface method. The system also includes a processor to translate the programming code from the first language to a second language, generate a definition of a general dispatch method, generate definitions of special dispatch methods, each of the special dispatch methods corresponding to each primitive return type of the interface method, and generate an invocation of either the general dispatch method or one of the special dispatch methods based on a return type of the interface method.

5 Claims, 3 Drawing Sheets

PROCESSING REIFIED GENERICS IN OBJECT-BASED PROGRAMMING ENVIRONMENTS

BACKGROUND

The present invention relates to object-based programming environments, and more specifically, to techniques to address dispatch speed when dealing with reified generics.

A number of new programming languages have been developed by commercial companies. Some of these languages include Fortress, Chapel, and X10. When these languages are designed to use the resources of existing languages, productivity is improved and past investment is more effectively utilized. One of these existing languages is Java, for example, and developers of many of the new programming languages strive to ensure compatibility with Java.

One of the important things that allow compatibility of new programming languages with existing languages, such as Java, is the use of generics of existing languages. Two types of generics are erased generics, in which the value of the type parameter is not available at runtime, and reified generics, in which the value of the type parameter is available at runtime. Two implementation techniques for reified generics are the type specialization technique, which generates a non-generic type for each different instantiation of a generic type, and the type lifting technique, which represents the value of the type parameter as a type descriptor.

When using the type lifting technique, a method (dispatch method) is invoked with particular type descriptor objects, and the dispatch method then calls the actual method that corresponds to the type descriptor objects in a technique called self dispatching. A dispatch method corresponds to multiple original methods with different return types. Thus, the return type of a dispatch method is a reference type. Consequently, primitives are converted to objects (boxed) in the callee and are restored to primitives (unboxed) in the caller. This boxing/unboxing creates an overhead cost with respect to execution time and memory usage. As a result, efficient self dispatching would be appreciated in programming languages.

SUMMARY

According to one embodiment, a system to process a reified generic includes a memory device configured to store programming code in a first language, the programming code including a definition and an invocation of an interface method; and a processor configured to translate the programming code from the first language to a second language, generate a definition of a general dispatch method, generate definitions of special dispatch methods, each of the special dispatch methods corresponding to each primitive return type of the interface method, and generate an invocation of either the general dispatch method or one of the special dispatch methods based on a return type of the interface method.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
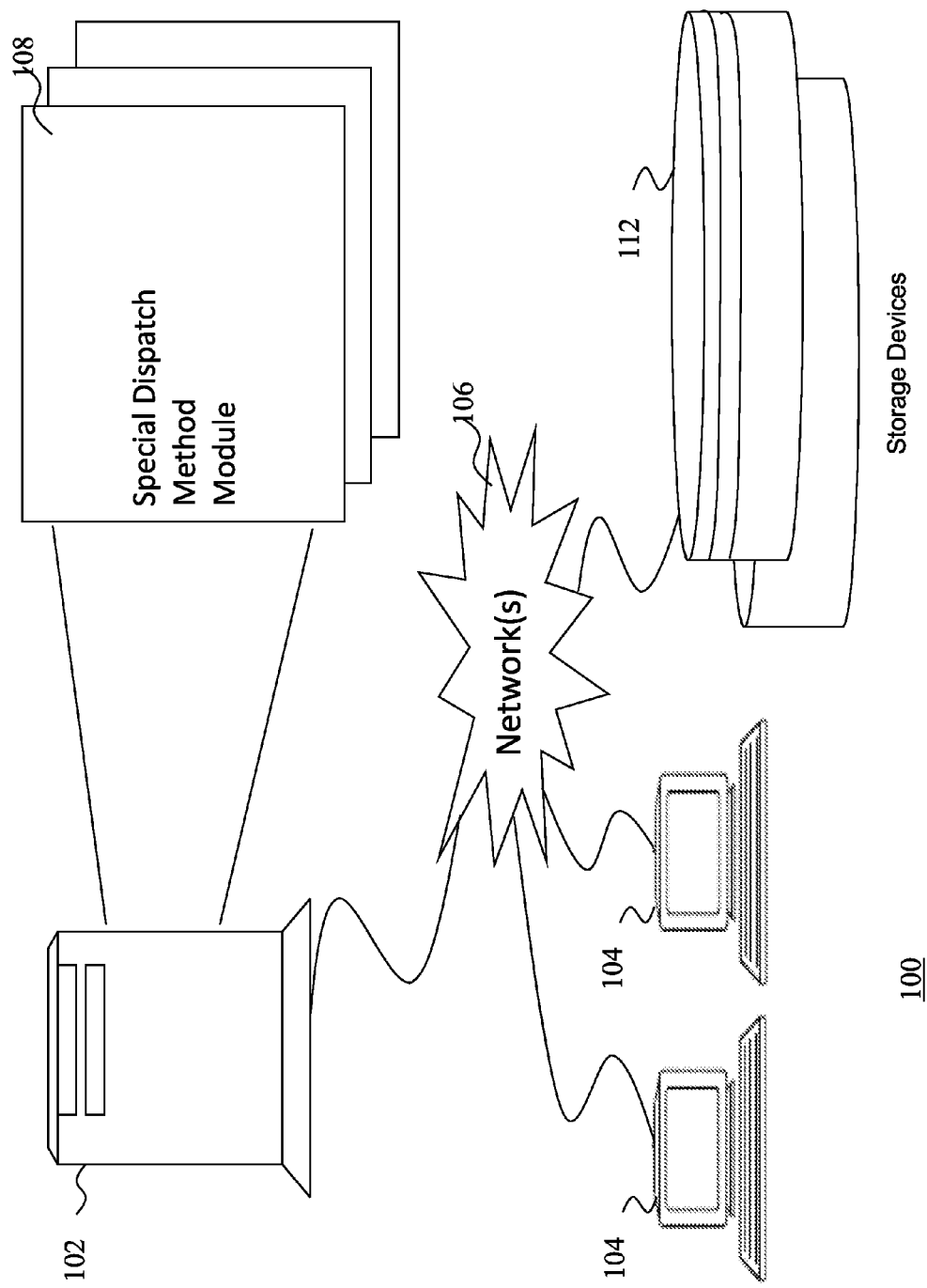
FIG. 1 is a block diagram of a system that implements special dispatch methods according to an embodiment.

Although embodiments of the invention are detailed below with reference to the Managed X10 programming language, alternate embodiments contemplate other programming languages and, thus, the exemplary detailed embodiments should not be regarded as limiting principles and aspects of the invention to the Managed X10 environment.

X10 is a programming language that supports reified generics. Managed X10 is an implementation of X10 that compiles X10 programs to Java for running the programs on a cluster of Java virtual machines (VMs). Thus, Managed X10 is a Java virtual machine (JVM) language with a goal of ensuring interoperability with existing Java programs. For example, it is convenient for Java programmers to call X10 code if an X10 generic type is seen as a Java generic type. To ensure the compatibility between compiler-generated code and existing Java code, Managed X10 leverages the same type erasure technique as in Java. However, because erased generics do not support some features that are supported by reified generics, X10 generics cannot be compiled directly to Java generics. Managed X10 translates each X10 source code file into equivalent source code in Generic Java.

However, this presents several issues. First, X10 supports unsigned numeric types while Java does not. Also, X10 supports reified generic types while Java only provides erased generics. In addition, X10 has the top type "Any" that is a supertype of value types (including primitive numeric types) and of reference types (objects), but in Java, primitive types and object types do not have a common supertype. The use of type lifting in Managed X10 fills the gap between reified generics and erased generics. Constructors in the generated code take a type descriptor object for each type parameter and store it in an instance field. Runtime type information of a generic type is represented as a combination of structural information stored in a static field, such as the super class or implemented interfaces, and the type descriptor object.

To implement overloading of a generic method, runtime type information of method parameters is needed. With type specialization, a generic type is compiled to a separate non-generic type specialized for a particular value of type parameter and, therefore, is naturally overloaded. However, with type lifting, a type descriptor object must be passed for each method parameter of generic type. When the method (called a dispatch method) is invoked with particular type descriptor objects, it then calls the actual method which corresponds to the type descriptor objects in a technique called self dispatching. However, self dispatching is slower than normal Java dispatching because it requires a comparison of type descriptor objects followed by an extra method invocation.

Method mangling is one way to address the issue of self dispatching being slower than Java dispatching, but method mangling applies only to virtual and static methods (name mangling) and constructors (parameter mangling). Java's dispatch mechanism can be directly leveraged and dispatch speed can be made equivalent to non-generic speed by encoding runtime type information to method signature. In name mangling, type parameters or signedness of method parameters is encoded into the method name. Because X10 has unsigned types but Java does not, signedness is encoded to use the same Java primitive for both signed and unsigned types. The result of the encoding is a string that can be used as a Java identifier. Because the name of a constructor is fixed in Java, name mangling cannot be applied for constructors. Instead, overloading of constructors is implemented by generating synthetic classes with the same name as the encoded strings and adding a dummy parameter of the synthetic class. This is called parameter mangling. Although method mangling addresses self dispatching cost for virtual and static methods and constructors, it is not applicable to interface methods. For interface methods, another technique to address boxing cost is proposed. This technique is the generation of special dispatch methods and is detailed below.

In X10, numbers, characters, and Boolean types are first-class types that can be passed to type parameters in X10 (numbers, characters, and Boolean are subtypes of x10.lang.Any). As a result, a method which returns Any can be implemented or overridden with a method which returns, for example, x10.lang.Int. This is called covariant overriding or covariant return type. This is not the case in Java (Java primitives are not subtypes of java.lang.Object). Thus, boxed object types can be used to represent primitive values so that the type java.lang.Object can be used to represent the top type. However, as noted above, boxing causes inefficiencies in both memory footprint and execution time. To address redundant boxing of primitives and useless return of dummy null values, embodiments of the invention include a special dispatch method and control function that determines when the special dispatch method should be called in lieu of the general dispatch method.

A special dispatch method is generated for each primitive or void return type. As previously noted, a single dispatch method corresponds to multiple actual methods. Thus, to handle multiple independent return types, the return type of the dispatch method needs to be the upper bound of all return types of the actual methods, which is usually Any. Because Any is compiled to java.lang.Object, the primitives need to be boxed. However, because a special dispatch method is generated for each primitive or void return type, the caller calls the appropriate special dispatch function when the return type is known as primitive or void at compile time. When the return type is not known as primitive or void at compile time, the caller calls the general dispatch method.

In one embodiment, each special dispatch method has a special suffix. For example, a "$" followed by a symbol corresponding with the type, as shown at Table 1 below:

TABLE 1

| X10 | Java | Java (when boxed) | Symbol |
| --- | --- | --- | --- |
| X10.lang.Byte | byte | x10.core.Byte | B |
| X10.lang.UByte | byte | x10.core.UByte | b |
| X10.lang.Short | short | x10.core.Short | S |
| X10.lang.UShort | short | x10.core.UShort | s |
| X10.lang.Int | int | x10.core.Int | I |
| X10.lang.UInt | int | x10.core.UInt | i |
| X10.lang.Long | long | x10.core.Long | J |
| X10.lang.ULong | long | x10.core.ULong | j |
| X10.lang.Float | float | x10.core.Float | F |

TABLE 1-continued

| X10 | Java | Java (when boxed) | Symbol |
| --- | --- | --- | --- |
| X10.lang.Double | double | x10.core.Double | D |
| X10.lang.Char | char | x10.core.Char | C |
| X10.lang.Boolean | boolean | x10.core.Boolean | Z |
| void | void | n/a | V |

Thus, as one example, a special dispatch method for an integer return type would have the suffix $I. As another example, a special dispatch method for a Boolean return type would have the suffix $Z according to Table 1.

Exemplary X10 code is shown at Table 2 below. The code correlates to both general and special dispatch methods. The interface methods at lines 2 and 10 have return types of Any. Thus, these methods do not correlate with special dispatch methods but, rather, with general dispatch methods that require boxing. On the other hand, interface methods at lines 6-9 have return types that are either numbers, characters, Boolean, or void. Thus, for these interface methods, special dispatch methods are generated that each have a return type of a primitive type and, therefore, do not require boxing.

TABLE 2

X10 Code

```
1 interface I[T] { }
2 interface J[T] { def f(I[T]):Any; }
3 abstract class S implements J[Int] {
4 abstract def f(I[Int]):Any;
5 }
6 interface K[T] { def f(I[T]):Int; }
7 interface L[T] { def f(I[T]):UInt; }
8 interface M[T] { def f(I[T]):Int; }
9 interface N[T] { def f(I[T]):void; }
10 interface O[T] { def f(I[T]):Any; }
11 class C extends S implements
  K[Int],L[Float],M[Any],N[UInt],O[Long]{
12 def f(I[Int]) = 1;
13 def f(I[Float]) = 2u;
14 def f(I[Any]) = 3;
15 def f(I[UInt]) { }
16 def f(I[Long]):Any = null;
17 }
18 val c = new C( );
19 val s:S = c;
20 val j:J[Int] = c;
21 val k:K[Int] = c;
22 val l:L[Float] = c;
23 val n:N[UInt] = c;
24 val vs = s.f(null);
25 val vj = j.f(null);
26 val vk = k.f(null);
27 val vl = l.f(null);
28 n.f(null);
29 val vck = c.f(null as I[Int]);
30 val vcl = c.f(null as I[Float]);
31 c.f(null as I[UInt]);
```

The translated Java code resulting from the exemplary X10 code above is shown at Table 3 below. As noted above, the interface methods at lines 2 and 10, which have return types of Any, result in general dispatch methods at lines 35 and 45. The interface methods at lines 6-9, which have a primitive type as the return type, correspond to special dispatch methods at lines 41-44 that do not require boxing. Further, the suffix of each special dispatch method reflects the primitive type of the return type of each of the special dispatch methods. For example, at line 42, the special dispatch method has the suffix $i, reflecting the fact that the corresponding interface method at line 7 has a return type UInt. Based on Table 1, UInt corresponds to the symbol "i."

TABLE 3

Translated Java Code

```
32 import x10.core.*;
33 import x10.rtt.*;
34 interface I<T> { }
35 interface J<T> { Object f(I a1, Type t1); } // dispatch method
36 abstract class S extends Ref implements J {
37 // dispatch method
38 Object f(I a1, Type t1) { return f__0$1x10$lang$Int$2((I) a1); }
39 abstract Object f__0$1x10$lang$Int$2(I a1); // bridge method
40 }
41 interface K<T> { int f$I(I a1, Type t1);}//special dispatch methods
42 interface L<T> { int f$i(I a1, Type t1); }
43 interface M<T> { int f$I(I a1, Type t1); }
44 interface N<T> { void f$V(I a1, Type t1); }
45 interface O<T> { Object f(I a1, Type t1); } // dispatch method
46 class C extends S implements K, L, M, N, O {
47 Object f(I a1, Type t1) { // dispatch method
48 if (t1.equals(ParameterizedType.make(I.$RTT, Types.INT))) // K
49 return Int.$box(f__0$1x10$lang$Int$2$O((I) a1));
50 if (t1.equals(ParameterizedType.make(I.$RTT, Types.FLOAT)))// L
51 return UInt.$box(f__0$1x10$lang$Float$2$O((I) a1));
52 if (t1.equals(ParameterizedType.make(I.$RTT, Types.ANY))) // M
53 return Int.$box(f__0$1x10$lang$Any$2$O((I) a1));
54 if (t1.equals(ParameterizedType.make(I.$RTT, Types.UINT))) // N
55 { f__0$1x10$lang$UInt$2((I) a1); return null; }
56 if (t1.equals(ParameterizedType.make(I.$RTT, Types.LONG))) // O
57 return f__0$1x10$lang$Long$2((I) a1);
58 throw new x10.lang.Error( );
59 }
```

The code shown as Table 4 below illustrates the calling mechanism for the Java code resulting from the exemplary X10 code. Lines 87-89 show calls to special dispatch methods. The comparison of type descriptor object in the special dispatch method to call the corresponding method is shown by lines 62-65.

TABLE 4

// special dispatch methods

```
61 int f$I(I a1, Type t1) {
62 if (t1.equals(ParameterizedType.make(I.$RTT, Types.INT))) // K
63 return f__0$1x10$lang$Int$2$O((I) a1);
64 if (t1.equals(ParameterizedType.make(I.$RTT, Types.ANY))) // M
65 return f__0$1x10$lang$Any$2$O((I) a1);
66 throw new x10.lang.Error( );
67 }
68 int f$i(I a1,Type t1){return f__0$1x10$lang$Float$2$O((I)a1);}//L
69 void f$V(I a1, Type t1) { f__0$1x10$lang$UInt$2((I) a1); } // N
70 Int f__0$1x10$lang$Int$2(I a1) { // bridge method
71 return Int.$box(f__0$1x10$lang$Int$2$O(a1));
72 }
73 int f__0$1x10$lang$Int$2$O(I a1) { return 1; } // actual methods
74 int f__0$1x10$lang$Float$2$O(I a1) { return 2; }
75 int f__0$1x10$lang$Any$2$O(I a1) { return 3; }
76 void f__0$1x10$lang$UInt$2(I a1) { }
77 Object f__0$1x10$lang$Long$2(I a1) { return null; }
78 }
79 C c = new C( );
80 S s = (S) c;
81 J<Int> j = (J<Int>) c;
82 K<Int> k = (K<Int>) c;
83 L<Float> l = (L<Float>) c;
84 N<UInt> n = (N<UInt>) c;
85 Object vs = s.f__0$1x10$lang$Int$2((I) null);
86 Object vj = j.f((I)null,ParameterizedType.make(I.$RTT, Types.INT));
87 int vk = k.f$I((I)null, ParameterizedType.make(I.$RTT, Types.INT));
88 int vl = l.f$i((I)null,ParameterizedType.make(I.$RTT,Types.FLOAT));
89 n.f$V((I) null, ParameterizedType.make(I.$RTT, Types.UINT));
90 int vck = c.f__0$1x10$lang$Int$2$O((I) null);
91 int vcl = c.f__0$1x10$lang$Float$2$O((I) null);
92 c.f__0$1x10$lang$UInt$2((I) null);
```

FIG. 1 is a block diagram of a system 100 that processes reified generics according to one embodiment. In the embodiment of FIG. 1, the system 100 includes a host computer 102 that executes computer instructions. The host computer 102 may operate in any type of environment in which a software application is executed. For example, the host computer 102 may comprise a high-speed computer processing device, such as a mainframe computer. While the host computer 102 may be a stand-alone computer with one or more memory devices and one or more processors of its own executing code stored in the host computer 102, the host computer 102 of the system 100 shown at FIG. 1 operates on one or more networks 106 that make the host computer 102 accessible to one or more client systems 104. The system 100 of FIG. 1 also includes one or more storage devices 112 that may be accessed by the host computer 102 or the client systems 104 over the network 106. The special dispatch method module 108 may be stored in a memory device of the host computer 102 itself or in one of the storage devices 112 accessible over the network 106. The special dispatch method memory module 108 includes the code (discussed above) relating to generating the special dispatch methods and determining whether to call a special dispatch method or a general dispatch method. The special dispatch method module 108 may additionally include a processor to execute the code or may supply the code to the processor of the host computer 108 or a client system 104 for execution.

Figure 2:
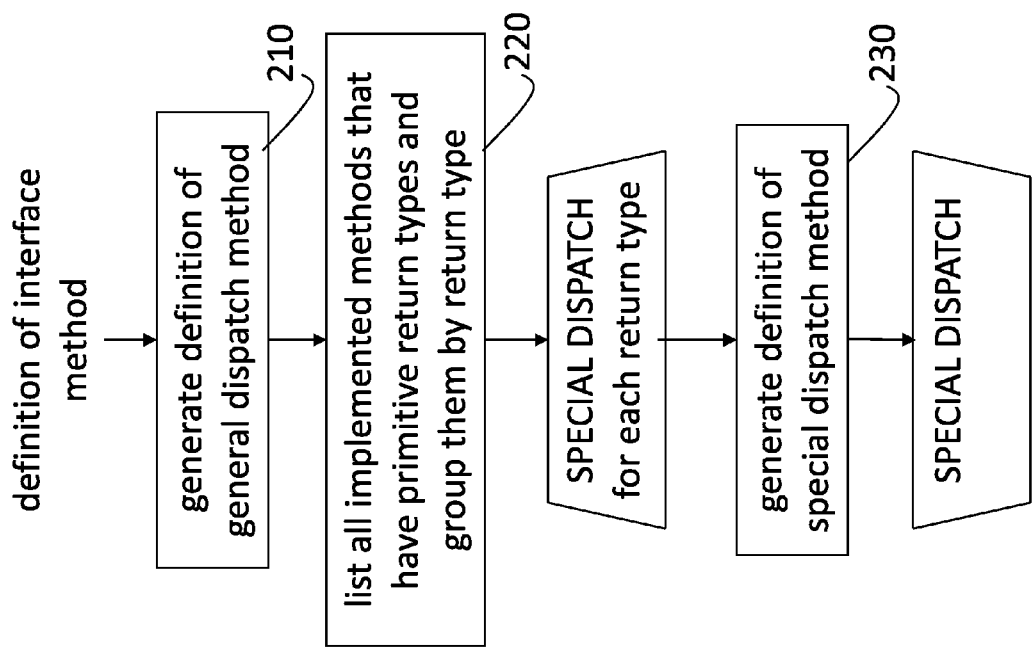
FIG. 2 depicts the processes involved in generating definitions of general and special dispatch methods according to embodiments.

FIG. 2 depicts the processes involved in generating definitions of general and special dispatch methods according to embodiments. The processes include generating a definition of a general dispatch method for every interface method at 210. In an exemplary embodiment, interface methods are written in X10 and corresponding dispatch methods are generated in Java. At 220, all the methods that implement the interface and return some primitive type are grouped by the return type. For each primitive return type, at 230, a definition of a special dispatch method with a special suffix is generated. As discussed above, the special suffix may include the symbol "$" followed by the symbol corresponding to the return type.

Figure 3:
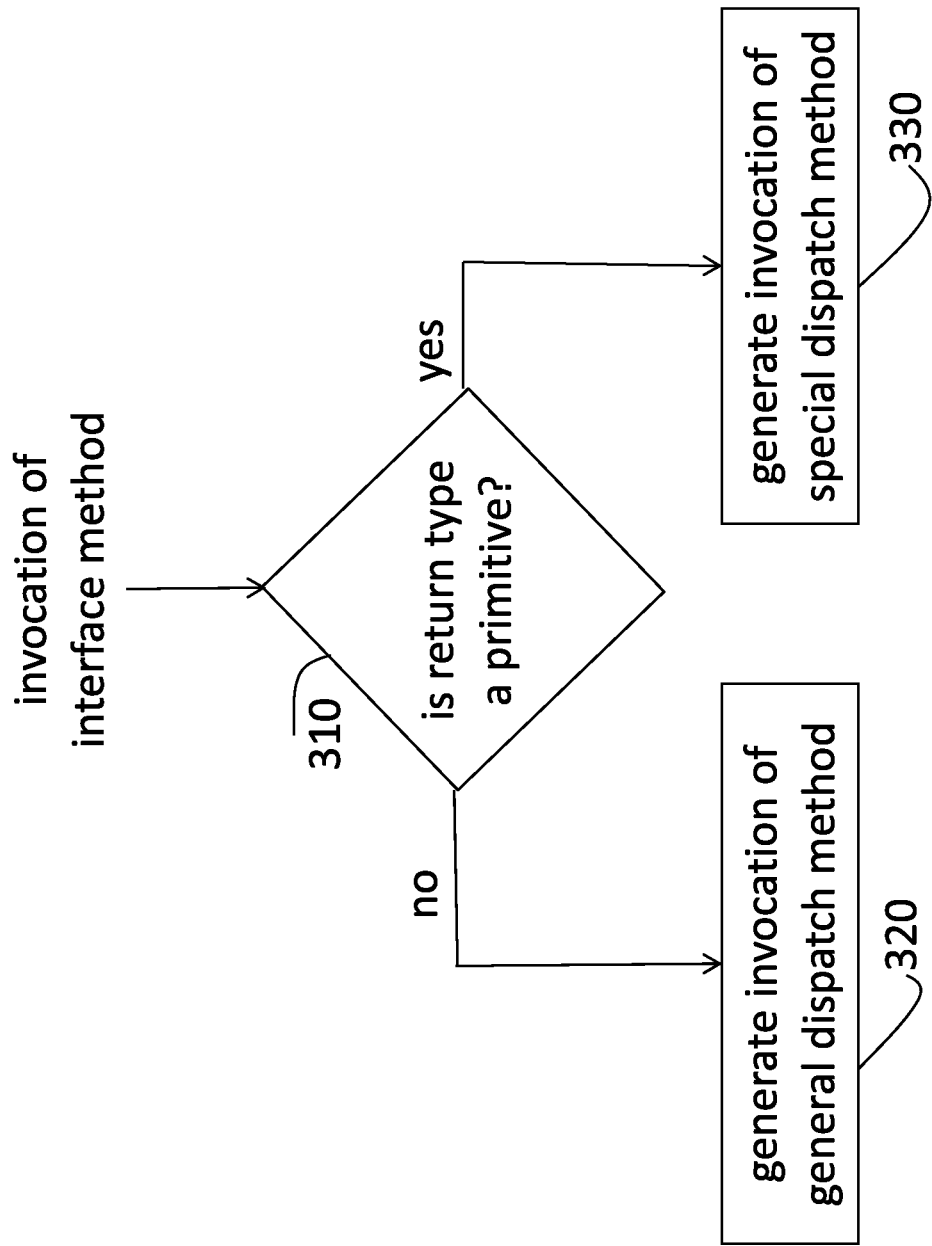
FIG. 3 depicts the processes involved in generating invocations of dispatch methods according to embodiments.

FIG. 3 depicts the processes involved in generating invocations of dispatch methods according to embodiments. For every invocation of an interface method, at 310, the return type of the interface method is checked. When the return type is a non-primitive type, at 320, an invocation of a general dispatch method is generated. When the return type is a primitive type, at 330, an invocation of a corresponding special dispatch method is generated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system to process a reified generic, the system comprising:
  a memory device configured to store programming code in a first language, the programming code including a definition and an invocation of an interface method; and
  a processor configured to execute a translation of the programming code from the first language to a second language, generate a definition of a general dispatch method, generate definitions of special dispatch methods, each of the special dispatch methods corresponding to each primitive return type of the interface method, and generate an invocation of either the general dispatch method or one of the special dispatch methods based on a return type of the interface method.

2. The system according to claim 1, wherein, when the return type of the interface method is a primitive return type, the processor invokes the one of the special dispatch methods that corresponds with the primitive return type.

3. The system according to claim 1, wherein the processor appends a special suffix to the general dispatch method name to generate each special dispatch method.

4. The system according to claim 3, wherein the processor accesses a look-up table from the memory device to determine a type symbol corresponding to the primitive return type associated with each special dispatch method as part of the special suffix.

5. The system according to claim 4, wherein the processor appends the special suffix to include a symbol "$" and the type symbol.

* * * * *